United States Patent [19]

Nagasawa

[11] Patent Number: 4,916,583

[45] Date of Patent: Apr. 10, 1990

[54] VEHICULAR HEADLAMP

[75] Inventor: Hidehiko Nagasawa, Kitawaki, Japan

[73] Assignee: Koito Seisakusho Company, Limited, Tokyo, Japan

[21] Appl. No.: 290,277

[22] Filed: Dec. 27, 1988

[30] Foreign Application Priority Data

Dec. 26, 1987 [JP] Japan .................................. 62-330540

[51] Int. Cl.[4] .............................................. B60Q 1/04
[52] U.S. Cl. ...................................... 362/61; 362/282; 362/284; 362/324; 362/428; 33/288
[58] Field of Search ..................... 362/61, 66, 80, 71, 362/269, 273, 282, 284, 287, 289, 322, 324, 372, 421, 424, 428; 33/288; 356/249

[56] References Cited

U.S. PATENT DOCUMENTS

| 1,609,634 | 12/1926 | Ryan | 33/348.2 |
| 3,047,968 | 8/1962 | Durbin | 37/104 |
| 3,612,854 | 10/1971 | Todd et al. | 362/269 |
| 4,794,495 | 12/1988 | McMahan et al. | 362/289 |
| 4,802,067 | 1/1989 | Ryder et al. | 362/61 |

Primary Examiner—Stephen F. Husar
Attorney, Agent, or Firm—Browdy and Neimark

[57] ABSTRACT

Disclosed herein is a vehicular headlamp which comprises a lamp housing having a front portion opened; a lens covering the opening of the front portion; a lamp bulb installed in the lamp housing for generating light when electrically energized; a light reflector installed in the lamp housing for reflecting the light from the lamp bulb toward the lens; an angular position adjustment mechanism for adjusting an angular position of the light reflector relative to the lamp housing; a spirit level fixed to an outer surface of the light reflector to move therewith; and a window structure defined by either one of the lens or the lamp housing, through which the level is viewed from the outside of the headlamp.

10 Claims, 9 Drawing Sheets

VEHICULAR HEADLAMP

BACKGROUND OF THE INVENTION

1. Field of the Invention

The present invention relates in general to vehicular headlamps, and particularly to vehicular headlamps of a type which comprises a housing with a front opening, a lens covering the opening, a lamp bulb installed in the housing for generating light and a light reflector installed in the housing for reflecting the light from the lamp bulb forward, that is, toward the lens. More specifically, the present invention is concerned with the vehicular headlamps of the type which is further equipped with an adjuster through which an angular position of the light reflector relative to the housing is adjustable.

2. Description of the Prior Art

In mounting a vehicular headlamp to a vehicle body, it is necessary to properly adjust an angular position of the headlamp relative to the vehicle body. Hitherto, for achieving the position adjustment, the lamp housing and/or the lens has been formed with a certain portion which serves as a reference point when adjusting the angular position of the headlamp relative to the vehicle body. That is, hitherto, the mounting of the headlamp to the vehicle body has been made while measuring and adjusting the angular position of the certain portion relative to the vehicle body with the aid of a specified adjusting tool.

In the vehicular headlamps, however, there is a type which has the light reflector arranged tiltable relative to the lamp housing. In the headlamps of this type, the above-mentioned mounting or positioning technique becomes useless because even when the angular position adjustment of the headlamp (namely, housing) relative to the vehicle body is accurately achieved, the position adjustment of the light reflector relative to the vehicle body is not assured. In fact, the direction of the light beam from the headlamp is mainly influenced by the angle of the light reflector relative to the vehicle body.

SUMMARY OF THE INVENTION

It is therefore an object of the present invention to provide a vehicular headlamp of a type having a tiltable light reflector, which can be properly mounted to a vehicle body with an easy mounting and positioning process.

According to the present invention, there is provided a vehicular headlamp which is equipped with a spirit level through which the angular position of the light reflector relative to the lamp housing can be determined from the outside of the headlamp.

According to the present invention, there is provided a vehicular headlamp which comprises a lamp housing having a front portion opened; a lens covering the opening of the front portion; a lamp bulb installed in the lamp housing for generating light when electrically energized; a light reflector installed in the lamp housing for reflecting the light from the lamp bulb toward the lens; angular position adjusting means for adjusting an angular position of the light reflector relative to the lamp housing; a spirit level fixed to an outer surface of the light reflector to move therewith; and a window structure defined by either one of the lens and the lamp housing, through which the spirit level is viewed from the outside of the headlamp, the window structure being positioned in the vicinity of the spirit level.

BRIEF DESCRIPTION OF THE DRAWINGS

Other objects will become apparent from the following description when taken in conjunction with the accompanying drawings, in which.

DETAILED DESCRIPTION OF THE INVENTION

Figure 1:
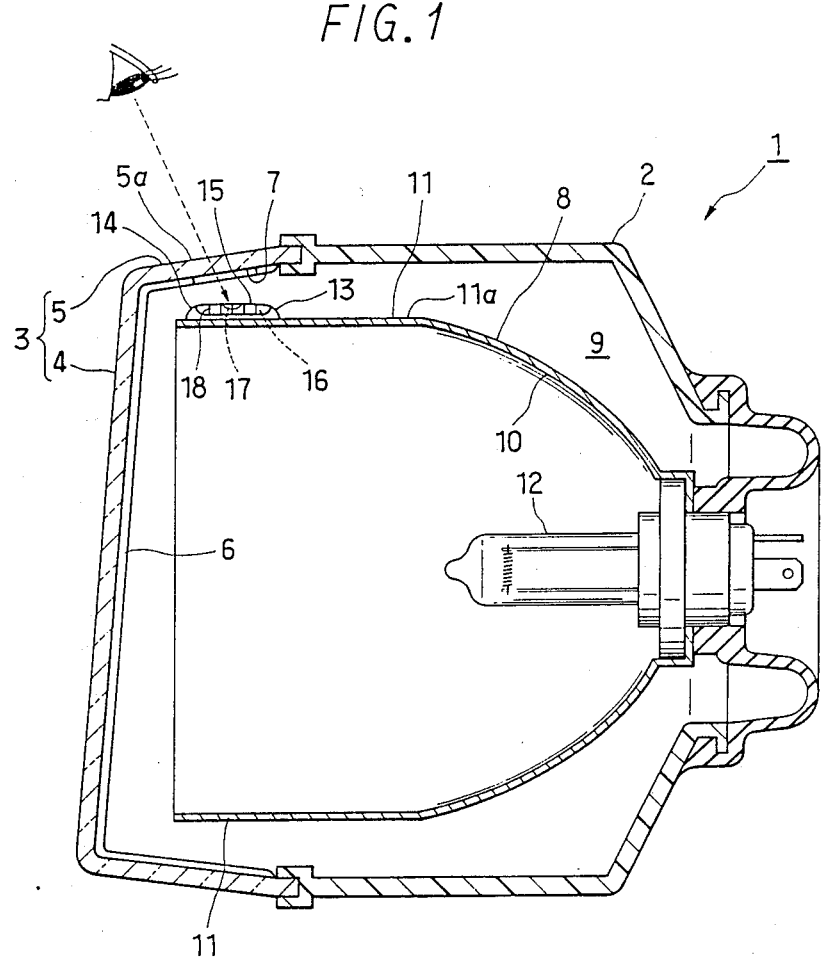
FIG. 1 is a vertically sectional view of a headlamp which is a first embodiment of the present invention.
Figure 2:
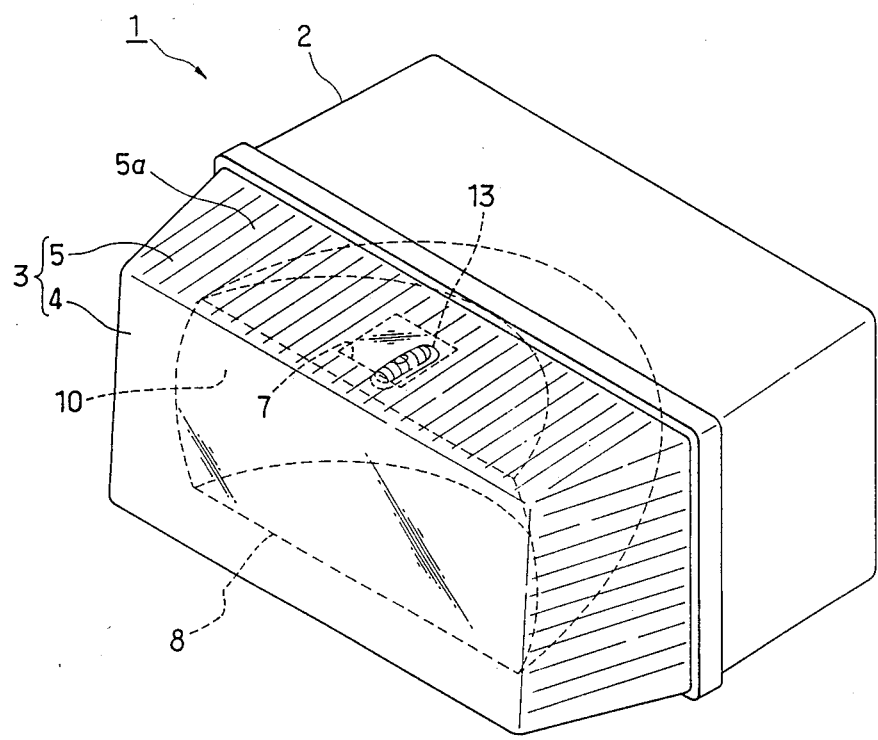
FIG. 2 is a perspective view of the headlamp.
Figure 3:
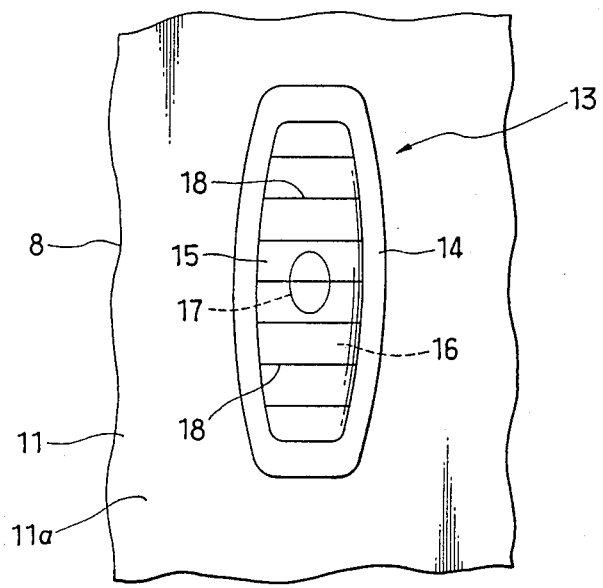
FIG. 3 is an enlarged plan view of a portion of the headlamp where a spirit level is mounted.
Figure 4:
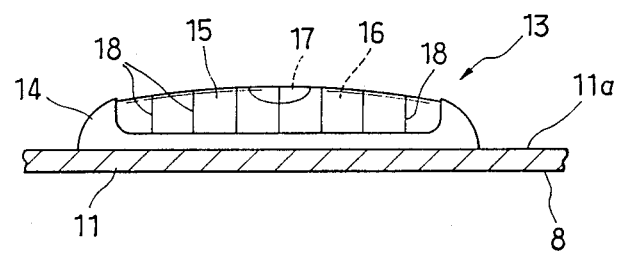
FIG. 4 is an enlarged side view of the spirit level.

Referring to FIGS. 1 to 4, there is shown a vehicular headlamp 1 of a first embodiment of the present invention.

In the drawings, denoted by numeral 2 is a lamp housing constructed of a reinforced plastic or the like, which has a front portion opened. Denoted by numeral 3 is a lens constructed of glass, plastic or the like, which comprises a forward facing major portion 4 and a peripheral wall portion 5. Designated by numeral 6 are lens steps formed on an inner surface of the lens 3.

The peripheral wall portion 5 of the lens 3 is formed at its upper surface 5a thereof a smoothed part 7 which is free of the lens steps 6 to serve as a o window as will become apparent as the description proceeds.

Denoted by numeral 8 is a light reflector which is pivotally mounted in a lamp room which is defined by the lamp housing 2 and the lens 3. The mechanism for pivotally supporting the light reflector 8 relative to the lamp room 9 will be described hereinafter.

The light reflector 8 is of a monolithic member, comprising a major part 10 having an inner surface of paraboloid of revolution and a peripheral wall part 11 extending forward from a periphery of the major part 10. At a center portion of the major part 10, there is detachably mounted a lamp bulb 12.

Denoted by numeral 13 is a spirit level of a type using a bubble tube. That is, the level 13 comprises a base plate 14, a transparent tube 15 laid on the base plate 14 and nonfreezing liquid 16 contained in the tube 15 with a bubble 17 remained. The center of the tube 15 is slightly bowed up from the horizontal longitudinally, so that when the tube 15 is kept horizontal, the bubble 17 assumes the center position of the tube 15.

The tube 15 is formed with graduations 18, so that an angle of the tube 15 relative to the horizontal is read from the graduation number at which the bubble 17 is placed.

The level 13 is fixed to an upper surface 11a of the peripheral wall part 11 of the light reflector 8 at a position which faces the window 7 of the lens 3. Thus, the angular position of the light reflector 8 relative to the lamp housing 2 can be determined by observing, through the window 7 of the lens 3, the position of the bubble 17 in the tube 15 from the outside of the headlamp 1.

Mounting of the vehicular headlamp 1 to a vehicle body (not shown) is carried out while observing the level 13 through the window 7. That is, the mounting is so made as to provide the angle of the light reflector 8 relative to the vehicle body with a desired degree. Of course, the angular position adjustment of the light reflector 8 may be carried out after the headlamp 1 is mounted to the vehicle body.

Figure 8:
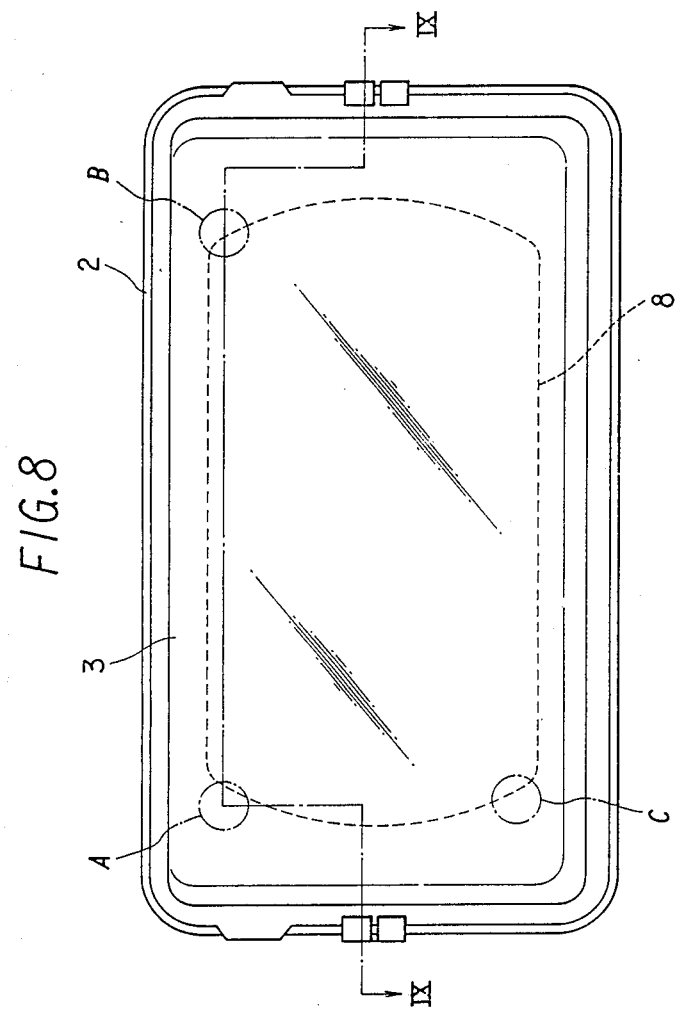
FIG. 8 is a front view of a light reflector tilting mechanism which is practically applied to the headlamps of the first, second and third embodiments of the present invention.
Figure 9:
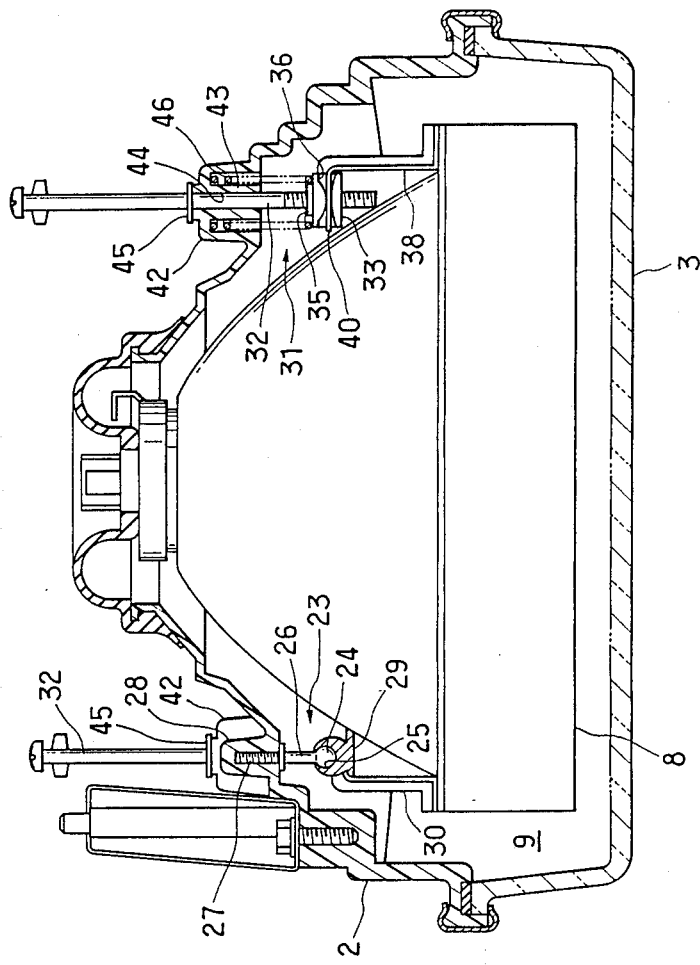
FIG. 9 is a sectional view taken along the line IX—IX of FIG. 8.
Figure 10A:
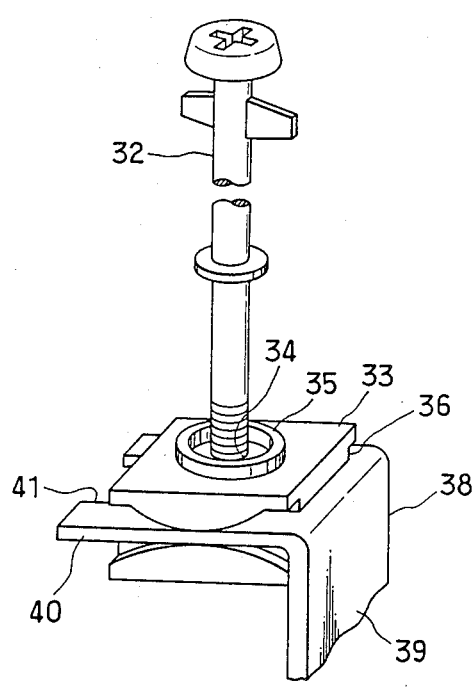
FIG. 10A is a partially cut perspective view of an aiming mechanism employed in the light reflector tilting mechanism.
Figure 10B:
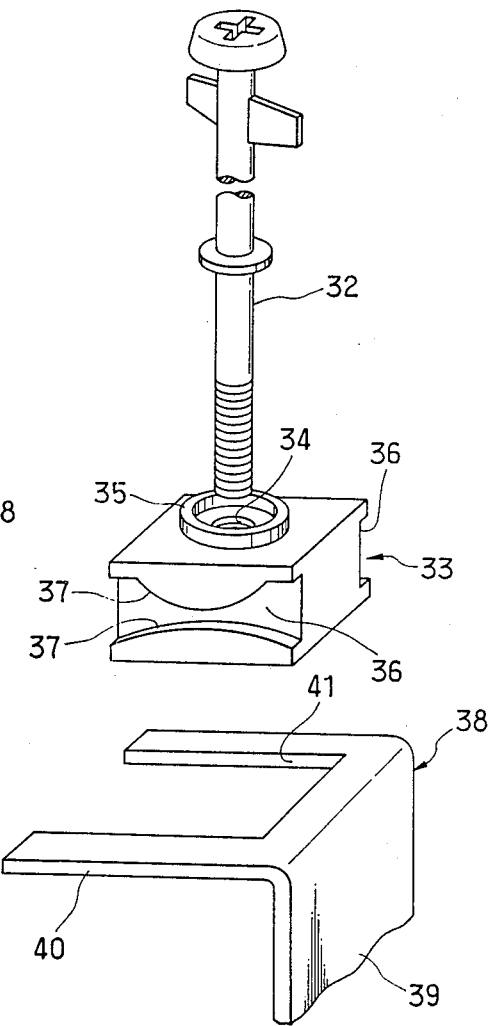
FIG. 10B is an exploded view of the aiming mechanism.

Referring to FIGS. 8 to 10, there is shown a light reflector adjusting mechanism which is practically o applicable to the above-mentioned first embodiment.

As will become apparent as the description proceeds, the light reflector 8 is connected to the lamp housing 2 by means of one pivoting mechanism 23 and two separated aiming mechanisms 31 and 31. References A, B and C denote the portions where the mechanisms 23, 31 and 31 are located. That is, as is seen from FIG. 8, the pivoting mechanism 23 is located at one of upper corners of the lamp housing 2, the aiming mechanism B is located at the other upper corner of the housing 2, and the other aiming mechanism C is located at one of lower corners of the housing 2 in the vicinity of the mechanism A. It is to be noted that an imaginary line passing through the mechanisms A and B and another imaginary line passing through the mechanisms A and C intersect at substantially right angles.

The pivoting mechanism 23 generally comprises a spherical projection 24 arranged on the lamp housing 2 and a spherical recess 25 arranged on the light reflector 8, the spherical projection 24 and the spherical recess 25 being coupled to form a so-called "ball-and-socket joint" therebetween. More specifically, the spherical projection 24 is formed on a leading end of a rod 26 which has a threaded base end 27 screwed into a boss portion 28 formed on the lamp housing 2. With this, the rod 26 is secured to the lamp housing 2. The spherical recess 25 is defined by a plastic block member 29. The block member 29 is fixed to a bracket 30 which is connected to the light reflector 8. Due to the "ball-and-socket joint connection" achieved by the pivoting mechanism 23, the light reflector 8 is universally tiltable relative to the lamp housing 2.

The aiming mechanism 31 located at the position B generally comprises an adjusting screw 32 rotatably supported by the lamp housing 2 and a nut 33 swingably mounted on the light reflector 8, the adjusting screw 32 being mated with the nut 33 in such a manner that rotation of the adjusting screw 32 about its axis varies the entire length of the aiming mechanism 31. The nut 33 is constructed of a reinforced plastic and has a threaded bore 34 formed therethrough. The nut 33 is formed at its rear end surface with an annular ridge 35 which surrounds the bore 34. The nut 33 is further formed at its side walls with respective engaging grooves 36 and 36 each extending perpendicular to the axis of the bore 34. Designated by numerals 37 and 37 are land portions between which each engaging groove 36 is defined. As is shown, the engaging groove 36 is so shaped that the width thereof gradually increases as the distance from the middle part of the groove 36 toward each end of the same increases. Denoted by numeral 38 is a metal bracket which is welded at its base portion to the light reflector 8 to move therewith. The bracket 38 has a leg 39 which has a leading end portion 40 bent toward the pivoting mechanism 23. The bent end portion 40 is formed with a rectangular recess 41 leaving beside the recess 41 opposed arms (no numerals). As is seen from FIG. 10B, the arms are received in the respective engaging grooves 36 and 36 of the nut 33, so that the nut 33 is swingably and slidably supported by the bent end portion 40 of the bracket 38. Designated by numeral 42 is a holding portion for the adjusting screw 32, which is located at a portion near the nut 33 on the light reflector 8. In the illustrated embodiment, the holding portion 42 is projected outwardly from the lamp housing 2. The holding portion 42 comprises a boss 43 having a through bore 44 through which a part of the adjusting screw 32 passes. The adjusting screw 32 has its leading end operatively engaged with the threaded bore 34 of the nut 33. As shown, a collar 45 is formed about a middle part of the adjusting screw 32, which is seated on the projected end of the holding portion 42 upon proper arrangement of the adjusting screw 32. A coil spring 46 is compressed between the nut 33 and the holding portion 42. The spring 46 has a front circular end disposed about the annular ridge 35 of the nut 33 and a rear circular end disposed about the boss 43 of the supporting portion 42, as is seen from FIG. 9. Thus, the coil spring 46 is stably held between the nut 33 and the holding portion 42.

When the adjusting screw 32 is turned about its axis in a certain direction, the nut 33 is moved along the axis of the adjusting screw 32 pivoting the light reflector 8 about the pivoting mechanism 23 relative to the lamp housing 2.

It is to be noted that the other aiming mechanism 31 located at the portion C has substantially the same construction as the above-mentioned aiming mechanism 31.

Thus, by suitably turning both the adjusting screws 32 of these two aiming mechanisms 31 and 31, the light reflector 8 is pivoted in univeral directions about the pivoting mechanism 23 and thus the light reflector 8 can assume a desired angular position relative to the lamp housing 2, that is, relative to the vehicle body to which the headlamp 1 is mounted. More specifically, when the adjusting screw 32 of the aiming mechanism 31 at the portion B is manipulated, the light reflector 8 is pivoted horizontally, while the adjusting screw of the aiming mechanism 31 at the other portion C is manipulated, the light reflector 8 is pivoted vertically.

Although the description of the light reflector tilting mechanism has been directed to the first embodiment 1 of FIGS. 1 to 4, the mechanism is also applicable to second and third embodiments of the present invention, which will be described in the following.

Figure 5:
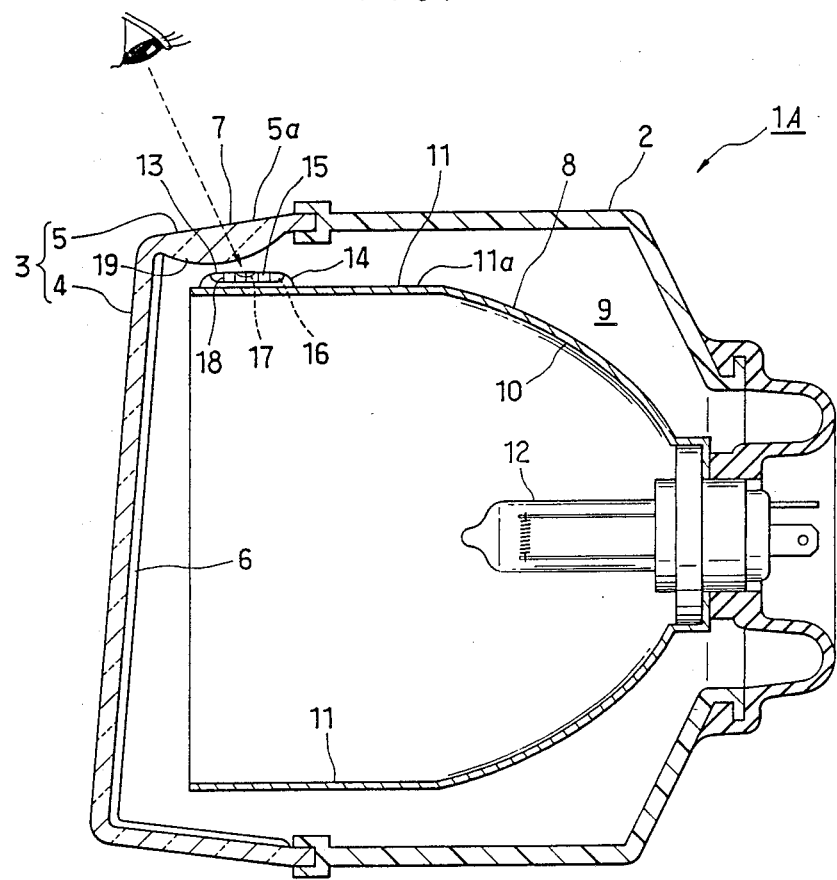
FIG. 5 is a view similar to FIG. 1, but showing a second embodiment of the present invention.

Referring to FIG. 5, there is shown a second embodiment IA of the present invention.

The second embodiment 1A is substantially the same as the afore-mentioned first embodiment 1 except that in the second embodiment 1A, a convex lens 19 is integrally formed on an inner surface of the window 7. With this convex lens 19, the bubble 17 in the tube 15 and the graduations 18 of the tube 15 are magnified thereby permitting easy reading of them.

Figure 6:
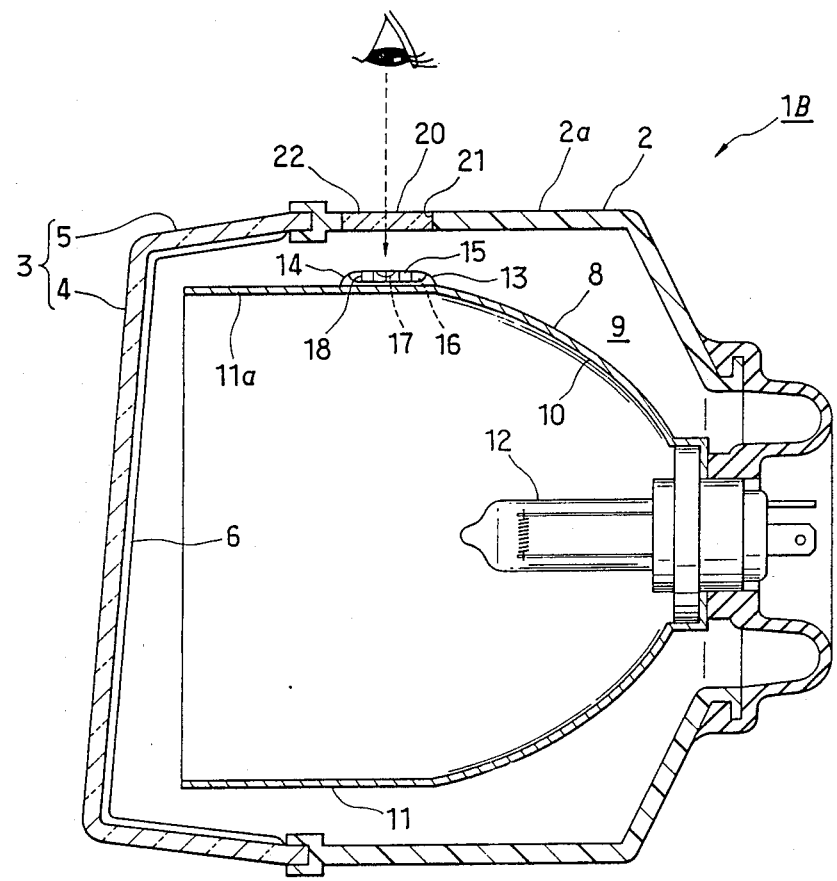
FIG. 6 is a view similar to FIG. 1, but showing a third embodiment of the present invention.
Figure 7:
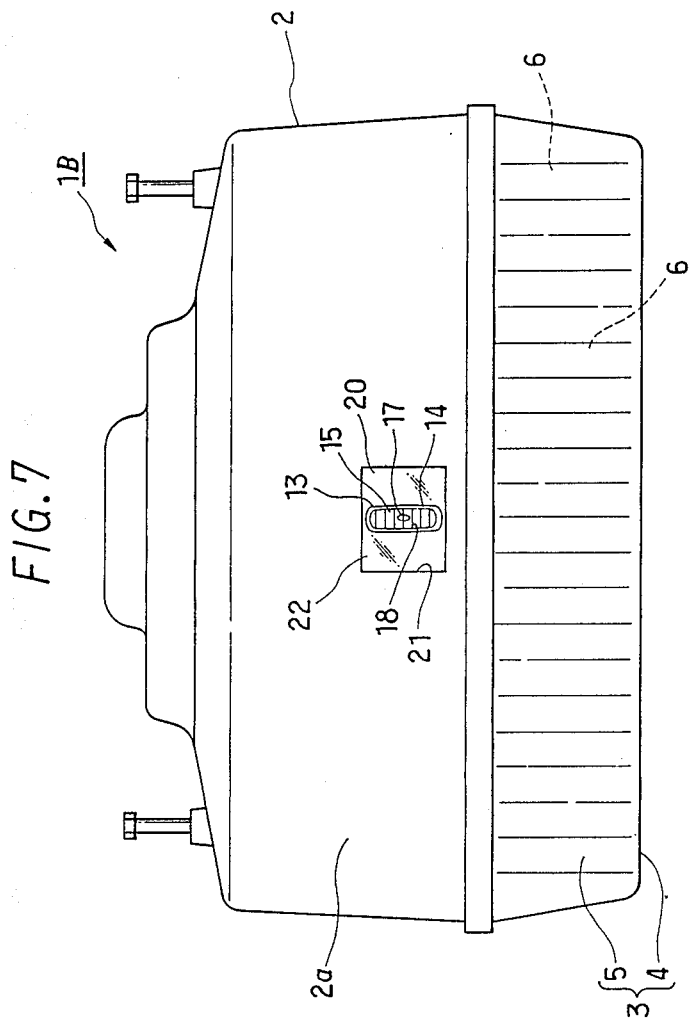
FIG. 7 is a plan view of the third embodiment.

Referring to FIGS. 6 and 7, there is shown a third embodiment 1B of the present invention.

Since the third embodiment 1B is similar to the aforementioned first embodiment 1, only the portions which are different from those of the first embodiment 1 will be described in the following.

Denoted by numeral 20 is a window which is provided at a generally middle part of an upper wall 2a of the lamp housing 2. The window 20 comprises an opening 21 formed in the upper wall 2a of the lamp housing 2 and a transparent plastic plate 22 covering the opening 21. The level 13 is fixed to the upper portion 11a of the light reflector 8 at a position which faces the window 20.

Thus, like in the case of the first embodiment 1, mounting of the vehicular headlamp 1A or 1B to a vehicle body can be carried out while observing the level 13 through the window 7 or 20.

What is claimed is:

1. A vehicular headlamp comprising:
    a lamp housing having a front portion opened;
    a lens covering the opening of the front portion;
    a lamp bulb installed in the lamp housing for generating light when electrically energized;
    a light reflector installed in said lamp housing for reflecting the light from said lamp bulb toward said lens;
    angular position adjusting means for adjusting an angular position of said light reflector relative to said lamp housing;
    a spirit level fixed to an outer surface of said light reflector to move therewith; and
    a window structure defined by said lens, through which said spirit level is viewed from the outside of said headlamp, said window structure being positioned in the vicinity of said spirit level.

2. A vehicular headlamp as claimed in claim 1, in which said window structure is located at a given portion of said lens, said given portion assuming an upper position with respect to said headlamp when said headlamp is practically mounted to a vehicle body.

3. A vehicular headlamp as claimed in claim 2, in which said window structure comprises a smoothed part defined by a peripheral wall portion of said lens.

4. A vehicular headlamp as claimed in claim 3, in which said window structure further comprises a convex lens integrally connected to an inner surface of said smoothed part.

5. A vehicular headlamp as claimed in claim 2, in which said window structure comprises:
    means defining an opening formed in a part of said lamp housing; and
    a transparent plastic plate covering said opening.

6. A vehicular headlamp comprising:
    a lamp housing having a front portion opened;
    a lens covering the opening of the front portion;
    a lamp bulb installed in the lamp housing for generating light when electrically energized;
    a light reflector installed in said lamp housing for reflecting the light from said lamp bulb toward said lens;
    angular position adjusting means for adjusting an angular position of said light reflector relative to said lamp housing;
    a spirit level fixed to an outer surface of said light reflector to move therewith; and
    a window structure defined by said lamp housing, through which said spirit level is viewed from the outside of said headlamp, said window structure being positioned in the vicinity of said spirit level.

7. A vehicular headlamp as claimed in claim 6, in which said window structure is located at a given portion of said lamp housing, said given portion assuming an upper position with respect to said headlamp when said headlamp is practically mounted to a vehicle body.

8. A vehicular headlamp as claimed in claim 7, in which said window structure comprises a smoothed part defined by a peripheral wall portion of said lens.

9. A vehicular headlamp as claimed in claim 8, in which said window structure further comprises a convex lens integrally connected to an inner surface of said smoothed part.

10. A vehicular headlamp as claimed in claim 7, in which said window structure comprises:
    means defining an opening formed in a part of said lamp housing; and
    a transparent plastic plate covering said opening.

* * * * *